United States Patent
Lehman et al.

(10) Patent No.: US 9,396,277 B2
(45) Date of Patent: Jul. 19, 2016

(54) ACCESS TO SUPPLEMENTAL DATA BASED ON IDENTIFIER DERIVED FROM CORRESPONDING PRIMARY APPLICATION DATA

(75) Inventors: Gregg T. Lehman, Seattle, WA (US); Vaishali De, Seattle, WA (US); Raul H. Rodriguez, Sammamish, WA (US); Alex Boyko, Redmond, WA (US); Greg Filpus, Bellevue, WA (US); Jiahe (Jack) Liu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 13/315,304

(22) Filed: Dec. 9, 2011

(65) Prior Publication Data

US 2013/0151657 A1 Jun. 13, 2013

(51) Int. Cl.
G06F 17/30 (2006.01)
H04L 29/08 (2006.01)

(52) U.S. Cl.
CPC .... *G06F 17/30882* (2013.01); *G06F 17/30575* (2013.01); *H04L 67/02* (2013.01); *H04L 67/10* (2013.01)

(58) Field of Classification Search
None
See application file for complete search history.

(56) References Cited

U.S. PATENT DOCUMENTS

| 6,173,287 B1* | 1/2001 | Eberman | G06F 17/30717 707/758 |
| 6,799,298 B2* | 9/2004 | deVries | G06F 17/30817 707/999.002 |
| 7,007,068 B2 | 2/2006 | Morkel | |
| 7,317,907 B2 | 1/2008 | Linkert et al. | |
| 7,444,387 B2 | 10/2008 | Douceur et al. | |
| 7,506,006 B2 | 3/2009 | Vadlamani et al. | |
| 7,536,444 B2* | 5/2009 | Kawamura | G06F 11/2064 709/212 |
| 7,606,810 B1* | 10/2009 | Jeavons | G06Q 30/02 |
| 7,685,177 B1 | 3/2010 | Hagerstrom et al. | |
| 8,219,543 B2* | 7/2012 | Vanderport et al. | 707/711 |
| 8,266,243 B1* | 9/2012 | Carlson | H04N 21/6582 709/202 |
| 8,291,041 B1* | 10/2012 | Burrell | G06F 17/30867 709/217 |

(Continued)

FOREIGN PATENT DOCUMENTS

CN 101448132 A 6/2009
CN 102801766 A 11/2012

OTHER PUBLICATIONS

Lee, Jason, "KeySlinger and StarSlinger: Secure Key Exchange and Encrypted File Transfer on Smartphones", Retrieved at <<http://reports-archive.adm.cs.cmu.edu/anon/2011/CMU-CS-11-115.pdf>>, May 2011, pp. 1-22.

(Continued)

*Primary Examiner* — Ninos Donabed
(74) *Attorney, Agent, or Firm* — Damon Rieth; Doug Barker; Micky Minhas

(57) ABSTRACT

Primary data for an application is stored at a remotely located first server such as cloud storage. A user of the application may wish to modify or add to the primary data to create supplemental data for which storage is not supported in the first server. Configurations herein include a way to store the supplemental data (e.g., edits, additions, etc.) on a second server at a second storage service provider (e.g. a corporate intranet). Different instances of the application executing on different computer devices by that same user can retrieve the primary data from the first storage service provider as well as retrieve the supplemental data from the second storage service provider.

13 Claims, 9 Drawing Sheets

(56) References Cited

U.S. PATENT DOCUMENTS

| | | | |
|---|---|---|---|
| 8,909,736 B1* | 12/2014 | Bosch | H04L 65/00 709/217 |
| 2002/0123334 A1* | 9/2002 | Borger et al. | 455/419 |
| 2003/0104470 A1* | 6/2003 | Fors et al. | 435/7.1 |
| 2004/0001099 A1* | 1/2004 | Reynar | G06F 17/2785 715/776 |
| 2004/0006737 A1* | 1/2004 | Colbath | G10L 25/78 715/201 |
| 2004/0059737 A1* | 3/2004 | Beck et al. | 707/100 |
| 2005/0108636 A1* | 5/2005 | Sylthe et al. | 715/525 |
| 2005/0195077 A1 | 9/2005 | McCulloch et al. | |
| 2006/0010377 A1* | 1/2006 | Anecki et al. | 715/530 |
| 2006/0020804 A1 | 1/2006 | Schleifer et al. | |
| 2006/0061806 A1* | 3/2006 | King et al. | 358/1.15 |
| 2006/0084429 A1* | 4/2006 | Buvaneswari | H04W 24/00 455/424 |
| 2006/0151592 A1* | 7/2006 | Poor | G06Q 30/02 235/375 |
| 2006/0253449 A1* | 11/2006 | Williamson et al. | 707/9 |
| 2007/0011140 A1* | 1/2007 | King | H04N 1/00244 |
| 2007/0011190 A1* | 1/2007 | Finney | 707/102 |
| 2007/0033280 A1* | 2/2007 | Popp | G06F 9/4428 709/224 |
| 2007/0033531 A1* | 2/2007 | Marsh | G06Q 30/02 715/738 |
| 2007/0112880 A1 | 5/2007 | Yang et al. | |
| 2007/0300143 A1* | 12/2007 | Vanderport et al. | 715/500 |
| 2008/0040768 A1* | 2/2008 | Robotham | H04L 29/06027 725/132 |
| 2008/0134083 A1* | 6/2008 | Farouki | G06F 17/241 715/800 |
| 2009/0144811 A1* | 6/2009 | Matsubara et al. | 726/5 |
| 2009/0300169 A1 | 12/2009 | Sagar et al. | |
| 2009/0319585 A1 | 12/2009 | Gokhale | |
| 2010/0049716 A1* | 2/2010 | Rothschild | 707/9 |
| 2010/0235434 A1 | 9/2010 | Henders et al. | |
| 2010/0293598 A1* | 11/2010 | Collart | G06F 17/30056 726/3 |
| 2011/0035464 A1* | 2/2011 | Dolin | G06Q 30/02 709/217 |
| 2011/0289050 A1 | 11/2011 | McCarthy et al. | |
| 2012/0117183 A1* | 5/2012 | Wong | H04L 63/101 709/217 |
| 2012/0259835 A1* | 10/2012 | Vanderport et al. | 707/711 |

OTHER PUBLICATIONS

"International Search Report", Mailed Date: Mar. 25, 2013, Application No. PCT/US2012/066916, Filed date: Nov. 29, 2012, pp. 9.

"First Office Action and Search Report Issued in Chinese Patent Application No. 201280060545.0", Mailed Date: Dec. 2, 2015, 8 Pages.

"Supplementary Search Report Issued in European Patent Application No. 12855383.1", Mailed Date: Dec. 22, 2015, 8 Pages.

Chappell, David, "Introducing the Azure Services Platform", Retrieved from <<http://solutions.devx.com/ms/developer-cloud/introducing-the-azure-services-plafform-242.html>>, Oct. 1, 2008, 31 Pages.

* cited by examiner

ACCESS TO SUPPLEMENTAL DATA BASED ON IDENTIFIER DERIVED FROM CORRESPONDING PRIMARY APPLICATION DATA

BACKGROUND

In areas of computer and network technologies, the terms "cloud" and "cloud computing" are often used as metaphors for certain network technologies such as the Internet, which is an abstraction of an underlying network infrastructure of computers, routers, servers, etc., that supports connectivity amongst many different types of computer resources.

So-called "cloud computing" is a natural evolution of the widespread adoption of virtualization, service-oriented architecture, autonomic, and utility computing. In certain cases, cloud computing abstracts the user from having to be an expert in or having to control certain application features; such features are managed by services in the cloud and the cloud storage is often provided by a third party entity known as a cloud storage service provider. Accordingly, cloud computing can provide a way to increase capacity or add capabilities to a computer system for user within an entity such as corporation (that is a separate entity that the cloud storage service provider), without the need to invest in new infrastructure, train new personnel, license new software, etc. Conventional cloud computing technologies provide users with example services such as remote document management and storage, email and contact management and the like, regardless of which device a user uses to connect to the cloud. In this manner, a user can access a document in the cloud on one computing device such as a desktop computer at his or her office, and then later access the same document from another computing device, such as his or her home computer. Applications that access cloud storage an do so using a set of standardized and well published application programming interfaces (APIs) and preset cloud storage data formats.

The cloud is thus instrumental in providing useful services to respective users and a respective device operated by a user may rely heavily or completely on services provided by the cloud. This provides the ability to execute an instance of a computer application on any of multiple different computers without the hassles of having to store the data associated with the application in a restrictive location such as a single computer device.

BRIEF DESCRIPTION

Use of conventional techniques such as cloud computing that enable execution of different instances of a software application on different computing devices can suffer from deficiencies. For example, suppose a third party cloud storage service provides cloud storage of specific data in a specific data format using a specific API (e.g. contact data in a given predetermined record format or data format such as XML). Multiple third party software companies may each develop and sell software programs (e.g. contact manager software) that accesses the data stored in the cloud in this specific data format. One vendor of such software might desire to create a new or updated version of the software that enables a user to add supplemental data to their contact information. As an example, the new version of the software may allow a user to identify contact information for people as being preferred or a favorite. In such cases, the cloud storage service provider may not support storage of this supplemental data since the predefined contact record or data format of the cloud storage is not adaptable to enable addition of the supplemental data. This may be the case since many vendors of different software programs that all manage contact data might utilize the same cloud storage service and thus the contact data format does not rapidly adapt to new data storage requirements from certain vendors. When this problem presents itself in conventional situations, the new version of the software must store the supplemental data in a local storage device (e.g. the disk system of that user's desktop computer on which the instance of the new version of the software is presently operating and installed). One problem with this conventional approach is that if the user operates that same software on another computing device (e.g. another instance of the software executing on his or her mobile device), the supplemental data created on the other computer system will not be available to the same version of the software for that same user on the mobile device because the cloud storage does not support storage of the supplemental data and the mobile device has no way to access the local disk of the other computing device that the user used to create the supplemental data.

Embodiments disclosed herein substantially overcome the deficiencies of the conventional techniques as discussed above. Embodiments herein include one or more ways to store supplemental data (e.g., data associated with modifications or additions to primary data that is stored by the third party storage provider such as cloud storage) at a secondary remote location (e.g., separate from the cloud, or in addition to the cloud storage) accessible by multiple devices operated by the user. As discussed herein, because supplemental data is available to each of the multiple devices, a user who uses a given software application on different computing devices can execute an instance of an application on any of these different devices and the techniques and mechanisms disclosed herein allow those separate instances of software to be provided with the supplemental data stored in a secondary storage location (e.g. a second cloud storage area, or a corporate server accessible to the multiple user computing devices and that supports storage of the supplemental data) in addition to data stored by the cloud.

In one example a user executes a first instance of an application on a first computer device in a network. Suppose the first instance is a contacts management software program that allows a user to manage contact data for individual people. Via the first instance of the application, the user retrieves primary application data from a first server. This primary application data may be, for example, data stored in a predefined or fixed data format as required for cloud storage (stored by the first server) operated by a given cloud storage vendor. During use of the first instance of the application, the user can operate the first instance to produce supplemental application data that is to be associated with the primary application data. For example, the user may purchase a new version of the contact manager software that enable the user to identify favorite contacts within the primary application data. The first server or first storage service provider (e.g. a cloud computing environment operated by a cloud storage vendor) that stores the primary application data in a given data format may not able to support storage of the supplemental application data since the cloud storage data format does not accommodate storage of the supplemental data. To overcome this problem, the first instance of the application receives the supplemental application data (e.g. from the user) and associates it with the primary application data. For example, in one embodiment, to associate the supplemental data with the primary application data, the first instance of the application computes a unique identifier value (e.g. a hash value) based at least in part on the primary application data. In a specific embodiment, generating the unique identifier value can include applying a hash function to at least a portion of the primary application data to produce the unique identifier value. Other examples are including, in the unique identifier, a hash of a user identity associated with the user operating the first instance of the application. The first instance of the application forwards the unique identifier value as well as the supplemental application data to a second server for subsequent retrieval of the supplemental application data. The second server may be, for example, a server that provides storage on a corporate intranet that is different than the cloud storage but that is also accessible to the user's various computing devices (that each operate independent instances of the contacts manager software program). The second server enables subsequent retrieval of the supplemental application data by any of one or more other instances of the application on user devices via the unique identifier, thus enabling the user experience on each device to include access to the supplemental data, even though the cloud storage (i.e. the first server) does not support storage of the supplement data.

Further details of example embodiments will be provided below in reference to the figures and detailed description and claims. Note that this preliminary discussion of example embodiments does not specify every embodiment and/or incrementally novel aspect of the present disclosure or claimed invention(s). Instead, this brief description only presents general embodiments and corresponding points of novelty over conventional techniques. For additional details and/or or possible perspectives (permutations) of the invention(s), and additional points of novelty, the reader is directed to the Detailed Description section and corresponding figures of the present disclosure as further discussed below. In addition to providing additional details associated with different embodiments, the Detailed Description below includes a further summary of embodiments. Accordingly, this brief description does not limit the scope of the invention and/or accompanying claims.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
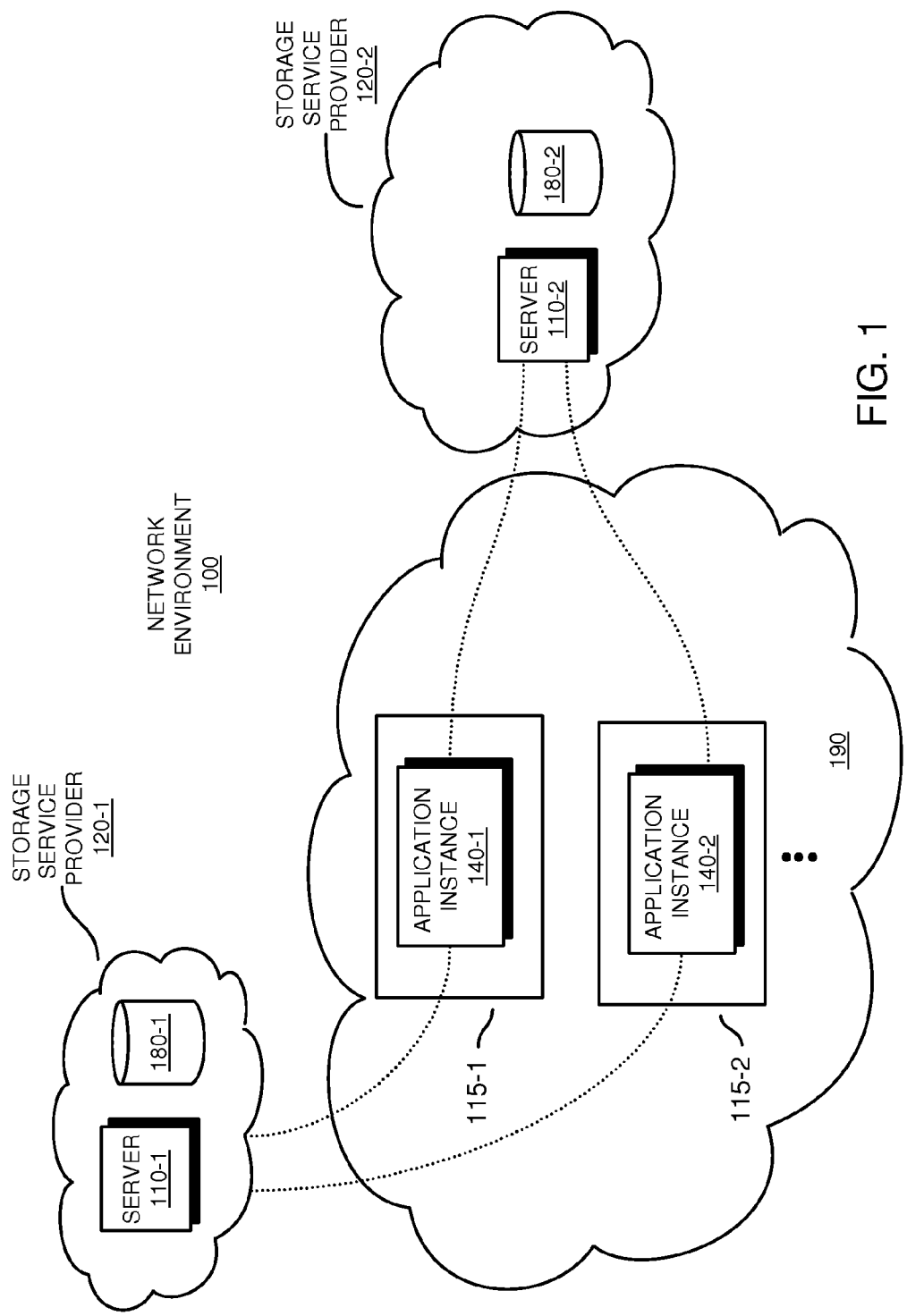
FIG. 1 is an example diagram of a network environment in which a first instance of an application initiates generation and subsequent storage of supplemental application data at a second server according to embodiments herein.

Example embodiments disclosed herein provide mechanisms that enable a user who uses multiple instances of a software application on different computing devices (e.g. the same program on a laptop computer, desktop computer and mobile device) to have access to all data created by those application instances. This system accommodates situations where some of the data (i.e., primary data) created and stored by the application is stored in cloud storage that may be, for example, operated by a third party vendor that has a limited or predefined data format. If the application enables a user to create supplemental data (e.g. a new version of application might provide for enhanced user features that require storage of supplement user data that cannot be stored in cloud storage given the data format limitations), the mechanisms disclosed herein all the application to store this supplemental data in secondary storage provided by a second storage service provider (e.g. non-cloud storage operated by a corporate intranet that the user's computing devices have access to).

According to one embodiment, primary data for an application can be stored at a remotely located first storage service provider in a cloud computing environment. As used herein, the term primary data includes data that the application can store in a first service provider on a first server that may be, for example, a cloud server. A user of the application may wish to modify the primary data in a way that is not supported by the first storage service provider. Such modifications, additions, or the like are referred to herein as supplemental data which cannot be stored in the first server operated by the first storage service provider (i.e. cannot be stored in the cloud for example because the cloud storage does not provide for this supplemental data in its data or record format). In other words, the first storage service provider may not support storage of the changes and/or additions (supplemental data) that the user would like to make to the primary data and that the user would like to be able to access on any of his or her computing devices. A conventional solution is to store the supplemental data locally in the user's device. However, in such conventional solutions, the user would not be able to (or it would be difficult for the user to) use the application on multiple devices while having access to this supplemental data. This is problematic when a user moves from one device to another and expects all data, changes and additions to be available on all devices.

To free a user from being restricted to executing an application on only a single computer device while having access to all data, configurations herein provide mechanisms and techniques to store modification data (e.g., supplemental application data such as, for example, edits or additions associated with the primary application data) at a second storage service provider over a network connection. Using the system disclosed herein, different instances of the application executing on different computer devices can retrieve the primary data from the first storage service provider (e.g. from a cloud operated by a third party vendor) as well as retrieve the supplemental application data from the second storage service provider (e.g. a corporate intranet server operated by an employer of the user of the software and which is a different entity that the third party cloud storage service provider). Thus, a respective user is not restricted to executing an instance of the application on only a single machine and is able to gain access to both primary and supplement data on multiple user computing devices.

FIG. 1 is an example diagram of a network environment in which a first instance of an application generates and stores supplemental application data at a second server according to embodiments herein.

In this example the network environment 100 includes multiple storage service providers 120 (e.g., storage service provider 120-1, storage service provider 120-2, etc.), and network 190. Storage service provider 120-1 includes server 110-1 and a respective repository 180-1 in which to store data. Storage service provider 120-1 may be a cloud storage service in this example operated by a given cloud server storage provider. Storage service provider 120-2 includes server 110-2 and a respective repository 180-2 in which to store data. Storage service provider 120-2 may be a corporate intranet in this example. It is to be understood that the storage service providers 120 may be the same or different entity, corporation or organization.

Network 190 can include resources such as the Internet, mobile phone network, etc., and can further include one or more computer devices 115 that can be operated by a same user or different users.

Each of the computer devices 115 can execute an instance of application 140 on behalf of one or more users. In this example, computer device 115-1 executes application instance 140-1 and computer device 115-2 executes application instance 140-2. In accordance with further embodiments, the same computer device can be used to execute the different application instances 140. The application instances 140-1 and 140-2 can be executed at the same or different times. In this example, the storage service provider 120-1 may be a cloud storage system operated by a third party cloud storage service (the first storage service provider) accessible over a public network such as the Internet. In contrast, in this same example, storage service provider 120-2 may be storage available within a corporate intranet that is only accessible to authorized users of application instances 140. The user of the application instances 140-1 and 140-2 may be an employee of the company (e.g. second storage service provider 120-2) who operates and/or controls access to the second server 110-2.

In general, as will be discussed in the following figures and text of this application, during execution, the application instance 140-1 operates on a client device and communicates with server 110-1 to produce and initiate storage of primary application data 210-1 (also referred to as primary data) in repository 180-1 (e.g. storage of data in the cloud that requires or may be limited by a specific predefined data format). In this example, assume that the user of the computer device 115-1 also produces supplemental data 250-1 (also referred to as supplemental application data). The supplemental data 250-1 may be produced from a user operating instances of the application 140. Examples of supplemental data 250-1 include a user providing an indication of favorites for given contacts in his or her contact list. This example is not meant to be limiting. The supplemental data 250-1 is any data that is produced by the application 140 (either instance 140-1 or 140-2) that cannot be stored along with the primary application data 210-1 by the first server 110-1 operated by the first storage service provider 120-1. There may be many reasons why the supplemental data 250-1 cannot be stored with the primary data 210-1. Examples include one or more situations in which a data format, record format, protocol, data type, size, security requirement, or other aspect or characteristic of the supplemental application data 250-1 is not technically supported, compatible with, or allowed to be stored by the storage server provider 120-1.

By way of example, the storage service provider 120-1 may not be configured to store certain types of data such as the supplemental data 250-1 in repository 180-1 because the data or record format required to store primary data 210-1 is not able to be extended in the cloud storage (i.e. by data stored by the first storage service provider 120-1) to include the supplemental data. This situation may exist if many entities have different software applications that store data using cloud storage provided by the first storage service provider 120-1 and the cloud storage data format is not updated frequently. By contrast, a software vendor of the application 140 may release new releases of the application 140 that enable a user to add additional information (e.g. identifying a given contact as a favorite contact) that was not present in earlier versions or releases of the application 140. In this example, this new favorites contact information is the supplemental data 250-1 that is not supported for storage by the first storage service provider 120-1. Via communications with server 110-2 as explained herein, the application instance 140-1 initiates storage of the supplemental data in repository 180-2.

Accordingly, a portion of application data can be stored at multiple different locations in network environment 100. For example, a first portion of application data can be stored in repository 180-1; a second portion of the application can be stored in repository 180-2; and so on. The system disclosed herein allows the multiple instances of the application 140 that operate on different devices 115 to identify situations in which there is supplemental application data available (i.e. stored in a secondary location 120-2, 180-2) and allows access (read, write, update) to this supplemental data without requiring modifications to data formats, protocols, storage mechanism and the like associated with the applications primary storage service provider 120-1 (e.g. a cloud storage environment). The system overcomes issues that arise, for example, when a software application 140 is initially released in a first version that allows access to a predefined data format that is operable to store data (referred to as primary data) in cloud storage. The application 140 may then be modified in a newer release to allow a user to create, store and/or update additional data, referred to as supplemental data 250-1. The cloud storage may be provided by a third party storage service that does not allow modification of data types, storage formats, or the like. As a specific example, the first storage service provider 120-1 may not update the cloud storage data format to support storage of this supplemental data 250-1. The system disclosed herein enables storage and access to this supplemental data 250-1 by storing it using a second server 110-2. As such, the system enables the application 140 to be modified and still use the cloud storage (e.g. 120-1) for storage of primary application data, while allowing the secondary or supplemental storage provider 120-2 to store the additional supplemental data 250-1. The system further enables different instances of the application 140 that a given user may operate on different computer systems (e.g. laptop, desktop and mobile devices) to all identify the existence of both the primary and supplement application data and to access these two sets of data for that user.

Figure 2:
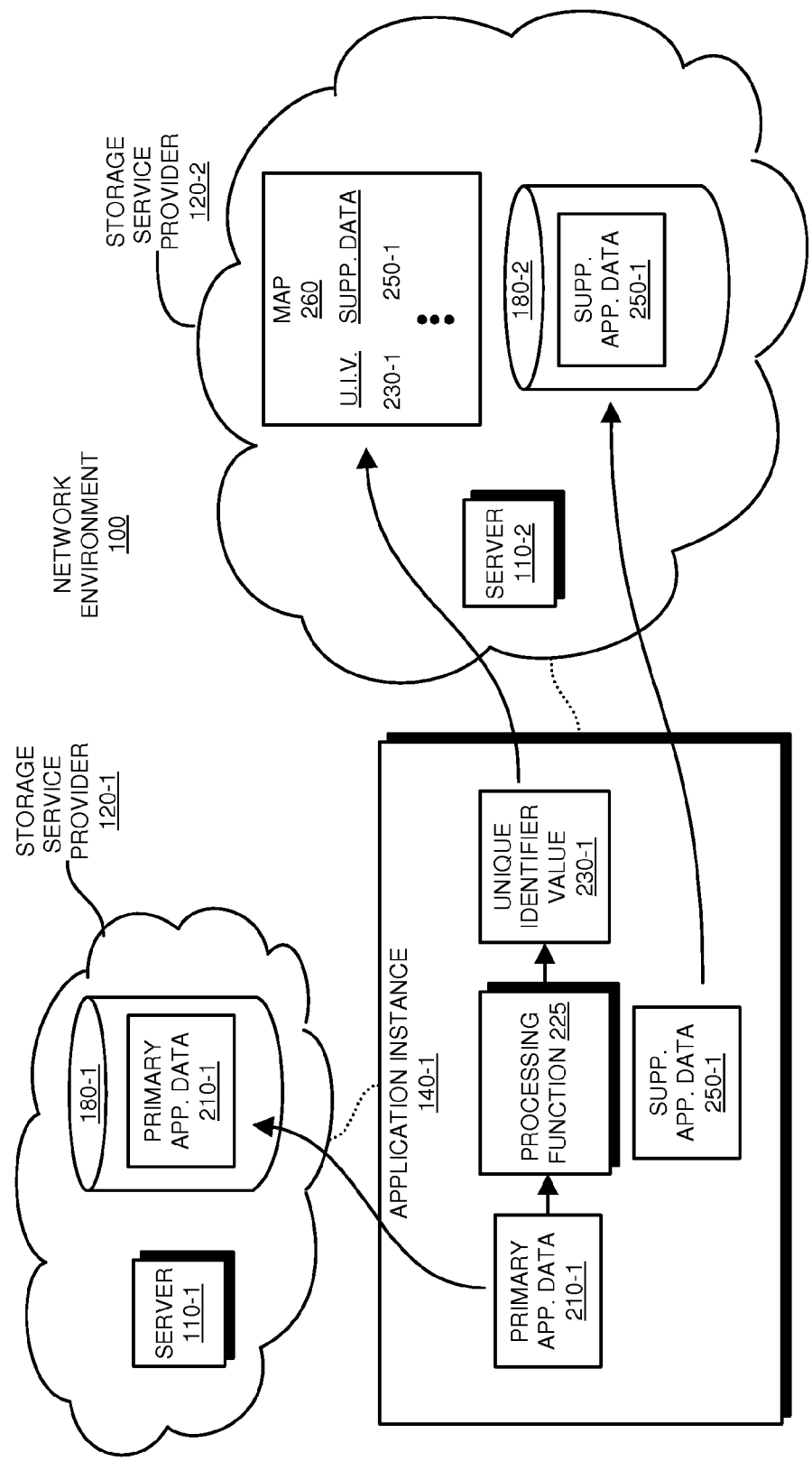
FIG. 2 is an example diagram of a network environment in which the first instance of the application generates a unique identifier value for subsequent indexing to supplemental application data at the second server according to embodiments herein.

FIG. 2 is an example diagram of a network environment in which the first instance of an application generates a unique identifier value for indexing supplemental application data according to embodiments herein.

For example, as shown, a user executes application instance 140-1 on a first computer device 115-1. Via the application instance 140-1, the user retrieves primary application data 210-1 via communications with server 110-1 of storage service provider 120-1. The user provides input to the application instance 140-1 to use the primary application data 210-1 for any suitable purpose such as to display information in a graphical user interface.

Note that if the primary application data 210-1 is not yet stored in the repository 180-1, the user can provide input to the application instance 140-1 to create such data and store it in repository 180-1.

In this example, during use of application instance 140-1, the user produces supplemental application data 250-1 with respect to primary application data 210-1 that is stored in repository 180-1. The supplemental application data 250-1 can indicate enhancements, modifications, edits, additional information, etc., with respect to the primary application data 210-1. Thus, supplemental application data 250-1 can be associated in some way with primary application data 210-1. By way of a non-limiting example, as will be discussed later in this specification, the primary application data 210 can be contacts information, enabling the user to communicate with one or more other persons in the network environment.

As mentioned, assume in this example, that the storage service provider 120-1 and server 110-1 storing the primary application data 210-1 is not able to support storage of the supplemental application data 250-1 produced by the user. In accordance with embodiments herein, the application instance 140-1 receives the supplemental application data 250-1 inputted from the user of computer device 115-1. As explained herein, the application 140 executing on computer device 115-1 associates the supplemental application data 250-1 with the primary application data 210-1. For example, in one embodiment, to associate the supplemental application data 250-1 with the primary application data 210-1, the application instance 140-1 utilizes processing function 225 to compute a unique identifier value 230-1 based on, for example, at least a portion of the primary application data 210-1. In a specific embodiment, the processing function 225 generates the unique identifier value 230-1 by applying a hash function to at least a portion of the primary application data 210-1 in combination with a user identity of a user operating first instance of the application. This produces a unique identifier value for the supplemental application data to allow access to the supplemental application data by the user of a second instance of the application on another device. In this manner, as the user operated the same software on different devices, the supplemental application data will be a available to each instance.

The application instance 140-1 forwards the unique identifier value 230-1 to the server 110-2. The application instance 140-1 also forwards supplemental application data 250-1 to second storage service provider 120-2 for storage in repository 180-2. The unique identifier 230-1 and supplemental application data 250-1 may be transmitted separately or together in a single record to the second storage service provider 120-2. In one embodiment, the storage service provider 120-2 associates the unique identifier value (UIV) 230-1 with the supplemental application data 250-1 by including an entry of the UIV 230-1 and a pointer to the supplemental application data 250-1 in map 260.

In one embodiment, the UIV 230-1 in map 260 serves as an index to the supplemental application data 250-1. For example, as discussed, the application instance 140-1 initiates storage of the supplemental application data 250-1 in repository 180-2 of storage service provider 120-2 because storage service provider 120-1 is unable to or is not configured to store the supplemental application data 250-1.

As discussed above, the application instance 140-1 also notifies the storage service provider 120-2 that the unique identifier value 230-1 corresponds to the supplemental application data 250-1. Thus, in one embodiment, the application instance 140-1 effectively produces the UIV 230 as an index entry in map 260. For example, the entry in map 260 associates the UIV 230-1 with a pointer to the supplemental application data 250-1 stored in the repository 180-2.

The server 110-2 of the storage service provider 120-2 enables subsequent retrieval of the supplemental application data 250-1 by any of one or more other instances of the application 140 operating in network environment 100. Generally, and as will be explained in more detail below, this is done by having any instance of the application 140, upon execution, computing the UIV value for a retrieved set of primary application data 210-1 and then transmitting this to the supplemental application data server 110-2. The server 110-2 can use the UID to check the map 160 to determine if any supplemental application data 250-1 exists.

A given user may execute application instance 140-1 at a first point in time. The given user may execute application instance 140-2 at a later time. Via access to the storage service providers 120, the given user is able to save modifications (e.g., via supplemental application data) in storage service provider 120-2 and retrieve them at a later time using an instance of the application 140 executed on the same or different computer device.

Figure 3:
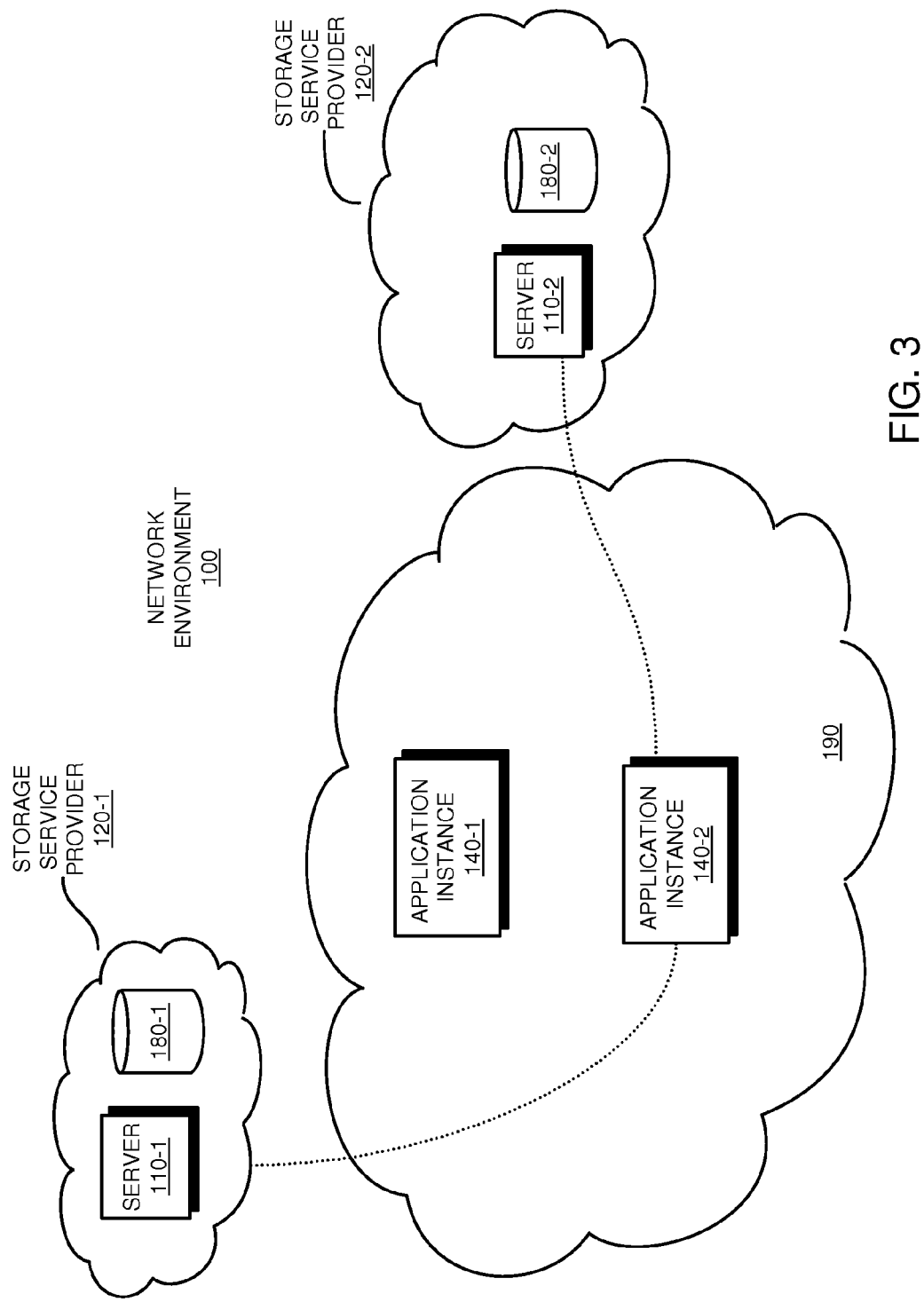
FIG. 3 is an example diagram of a network environment in which a second instance of an application initiates retrieval of stored supplemental application data from the second server according to embodiments herein.

FIG. 3 is an example diagram of a network environment in which a user operating a second instance of an application initiates retrieval of stored supplemental application data from the second server according to embodiments herein using the UIV 230.

As shown, the application instance 140-2 communicates with storage service provider 120-1 to retrieve primary data stored in repository 180-1. Application instance 140-2 produces the UIV 130 and communicates the UIV 130 to the storage service provider 120-2 to retrieve supplemental data from repository 180-2. As mentioned, and as further discussed below, the ability to store and retrieve the supplemental application data from storage service provider 120-2 using a UIV enables one or more users to execute an instance of the application 140 from a computer device at any location in network environment 100 without losing data or having to store the data locally in the computer device.

Figure 4:
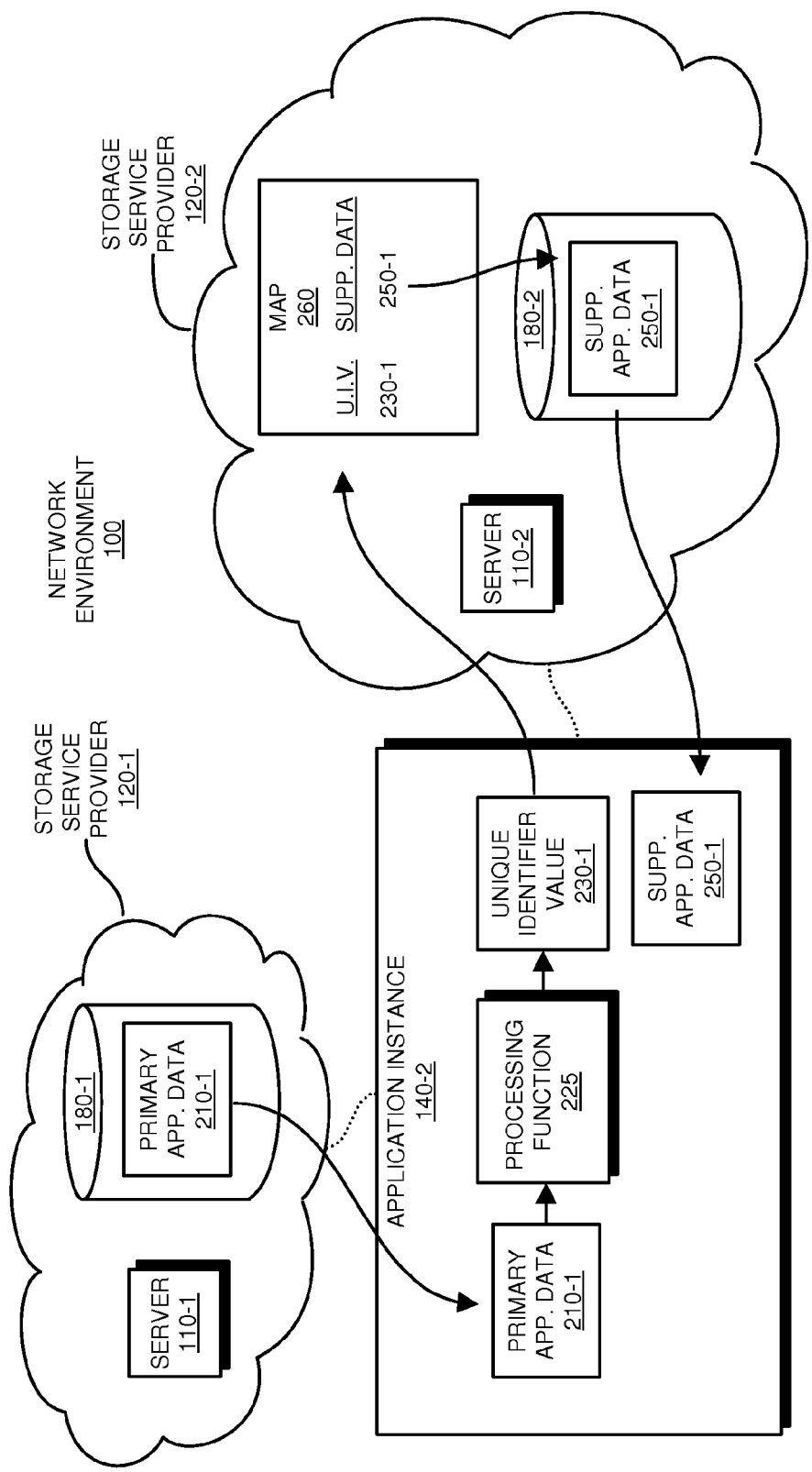
FIG. 4 is a more specific example diagram of a network environment in which the second instance of the application initiates retrieval of stored supplemental application data from the second server using a unique identifier value according to embodiments herein.

FIG. 4 is an example diagram of a network environment in which the second instance of the application initiates retrieval of stored supplemental application data from the second server using a unique identifier value according to embodiments herein.

Assume in this example that a user in network environment 100 initiates execution of application instance 140-2 on a respective computer device such as 115-2 (FIG. 1).

The application instance 140-2 displays a graphical user interface for viewing by the user. Via input with respect to the graphical user interface, a user can request to view data (either primary or supplemental) associated with the application 140 that happens to be stored in either or both repository 180-1 and repository 180-2.

In this example, assume that the user of application instance 140-2 operates the graphical user interface to display information requiring at least the retrieval of primary application data 210-1 from repository 180-1. In response to the input, the application instance 140-2 retrieves the primary application data 210-1 from the storage service provider 120-1. As discussed below, the graphical user interface of application instance 140-2 can be operated by the user in a manner (e.g. user requests to see his or her favorite contacts) that requires the application instance 140-2 to retrieve the supplemental application data 250-1.

Recall in this example that the server 110-1 of storage service provider 120-1 is unable to store the supplemental application data 250-1 in repository 180-1 (e.g. the supplemental data 250-1 is not storable in a cloud storage system). By way of a non-limiting example, the supplemental application data 250-1 can indicate special features to apply when displaying data on the graphical user interface and the data, record format, protocol or other operation of the cloud storage system provided by the provider 120-1 does not support storage of this supplemental data 250-1.

In one embodiment, the application instance 140-2 performs a query to server 110-2 to check whether modification or supplemental application data is available for retrieval from storage service provider 120-2. As explained below, this is done by computing a UIV 130 for the primary data 210-1 and sending this UIV value to the secondary (supplemental) storage service provider 1202. If there is supplemental application data available for primary application data 210-1, the application instance initiates retrieval of such data from storage service provider 120-2.

To retrieve the supplemental application data 250-1, subsequent to retrieving a copy of the primary application data 210-1, the application instance 140-2 produces a unique identifier value (the same UIV that was previously generated by the application instance 140-1) based at least in part on processing (i.e. retrieving) of the primary application data 210-1 retrieved from server 110-1. For example, in one embodiment, the application instance 140-2 applies a processing function 225 such as a hash function to at least a portion of the primary application data 210-1 to produce the unique identifier value 230-1. The hash function can include hashing some portion or multiple different portions or all of the primary application data 210-1 to get the UIV 130-1. The user identity can be included in this hash to produce a UIV 230-1 to can be used to associate the specific proper set of supplemental application data 250 for that application (i.e. for that version) for that user.

In one embodiment, the processing function 225 is the same processing function used by the first application instance 140-1 to produce unique identifier value 230-1 when the supplemental application data was initially produced.

In this example, assuming the primary application data 210-1 has not changed since the application instance 140-1 stored primary application data 210-1 in repository 180-1, the processing function 225 of application instance 140-2 produces the same index value that the application instance 140-1 generated when initiating storage of the supplemental application data 250-1 in storage service provider 120-2.

For example, the application instance 140-2 produces unique identifier value 230-1 based on primary application data 210-1. In this instance, the unique identifier value 230-1 produced by the application instance 140-2 is the same as the unique identifier value 230-1 produced by the application instance 140-1 because both instances of application 140 apply the same processing function to the same primary application data 210-1.

Application instance 140-2 utilizes the unique identifier value 230-1 it just produced as an index to identify supplemental application data to retrieve from storage service provider 120-2. For example, the application instance 140-2 initiates retrieval of the supplemental application data 250-1 by forwarding the unique identifier value 230-1 it produced to the server 110-2. The server 110-2 maps the unique identifier value 230-1 to a location in which the supplemental application data 250-1 is stored in repository 180-2.

The server 110-2 retrieves the supplemental application data 250-1 from repository 180-2 and forwards it to the application instance 140-2. The application instance 140-2 thus receives the supplemental application data 250-1 from the server 110-2.

In one embodiment, the application instance 140-2 utilizes the retrieved primary application data 210-1 to identify primary settings information. The application instance 140-2 utilizes the retrieved supplemental application data 250-1 to identify modifications with respect to the primary settings as specified by the primary application data 210-1.

In this manner, each of multiple different application instances of the same executed application can access application data stored at one or more different locations in a cloud without having to store the data locally in a single computer device, which would potentially restrict usage of the application.

As mentioned, the primary application data 210-1 and the corresponding supplemental application data 250-1 can be contacts information used in an address book application. In such an embodiment, when the user initiates an action, command, etc., in which application data cannot be written back to storage service provider 120-1 located in network environment 100, the application instance 140-1 creates a unique identifier value 230-1 (e.g., an index value, a hash-based key, etc.) based on properties of the primary application data 210-1 (e.g., specific contact information). The application instance 140-1 uses the unique identifier value 230-1 as a key or index value to store the additional contact information that is identified only by the key. For example, in one embodiment, the client or application instance 140-1 then transmits the unique identifier value 230-1 to storage service provider 120-2. The server 110-2 stores the unique identifier value (e.g., key, index value, hash value, etc.) and allows the supplemental application data 250-1 to be provided (via the mechanisms disclosed herein) to any client (e.g., application instance 140 in network environment 100) that has access to the address book and respective application data.

In one embodiment, when the application instance 140-2 attempts synchronization, the application instance 140-2 produces a unique identifier value for each of the contacts as specified by the primary application data stored and retrieved from storage service provider 120-1. The application instance 140-2 forwards the unique identifier values to the server 110-2 to check whether supplemental data is available for each respective contact. If so, the server 120-2 forwards the appropriate supplemental application data to application instance 140-2. Via retrieval of the primary application data and the supplemental application data for each contact in an address book, the application instance 140-2 can be properly synchronized.

In certain cases, there may not be any supplemental application data for a given set of primary data stored in repository 180-1. In such an instance, the application instance 140-2 utilizes only the primary application data retrieved from storage service provider 120-1 to initiate display of corresponding information in the graphical user interface.

Figure 5:
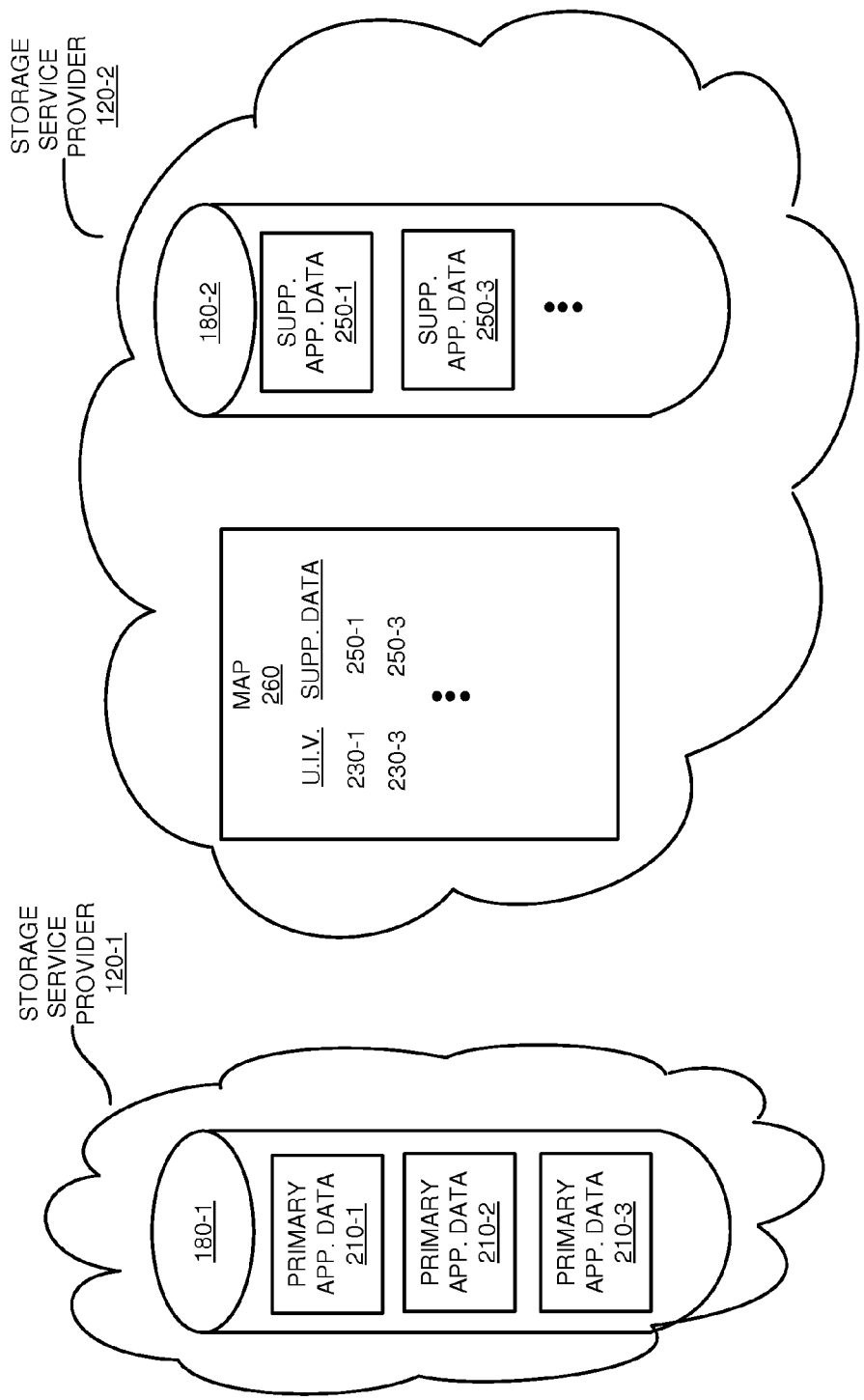
FIG. 5 is an example diagram illustrating use of unique identifier values mapping primary application data and supplemental application data according to embodiments herein.

FIG. 5 is an example diagram illustrating use of unique identifier values to map primary application data with supplemental application according to embodiments herein.

As previously discussed, the user of a respective application 140 initiates storage of multiple sets of primary application data 210 (e.g., primary application data 210-1, primary application data 210-2, primary application data 210-3, etc.) in repository 180-1 of storage service provider 120-1. As mentioned, by way of a non-limiting example, the primary application data can be contact information.

As previously discussed, a respective user can modify the primary application data via generation of supplemental application data. In this example, the user produces supplemental application data 250-1.

In a manner as previously discussed, the respective application instance 140-1 produces unique identifier value 230-1 and initiates storage of the supplemental application data 250-1 and unique identifier value 230-1 at storage service provider 120-2.

As further shown in this example, the user produces supplemental application data 250-3 associated with primary application data 210-3. The respective application instance 140-1 produces unique identifier value 230-3 and initiates storage of the unique identifier value 250-3 and corresponding supplemental application data 250-3 in storage service provider 120-2.

As mentioned, map 260 stores the association between the unique identifier values and the supplemental data produced for respective primary application data.

In one embodiment, the storage service provider 120-2 can store supplemental data for each of multiple different users. In such an instance, the map can be configured to group the identifier values on a per user basis. For example, the application instance requesting to retrieve the supplemental application data can also provide a user identifier to the server 110-2 when checking for availability of supplemental application data.

Via the user's identifier, the storage service provider 120-2 can identify a corresponding group of unique identifier values to check in the map 260 (rather than checking all unique identifier values in the map 260) in order to identify whether supplemental application data is stored in the storage service provider 120-2 for the user.

Figure 6:
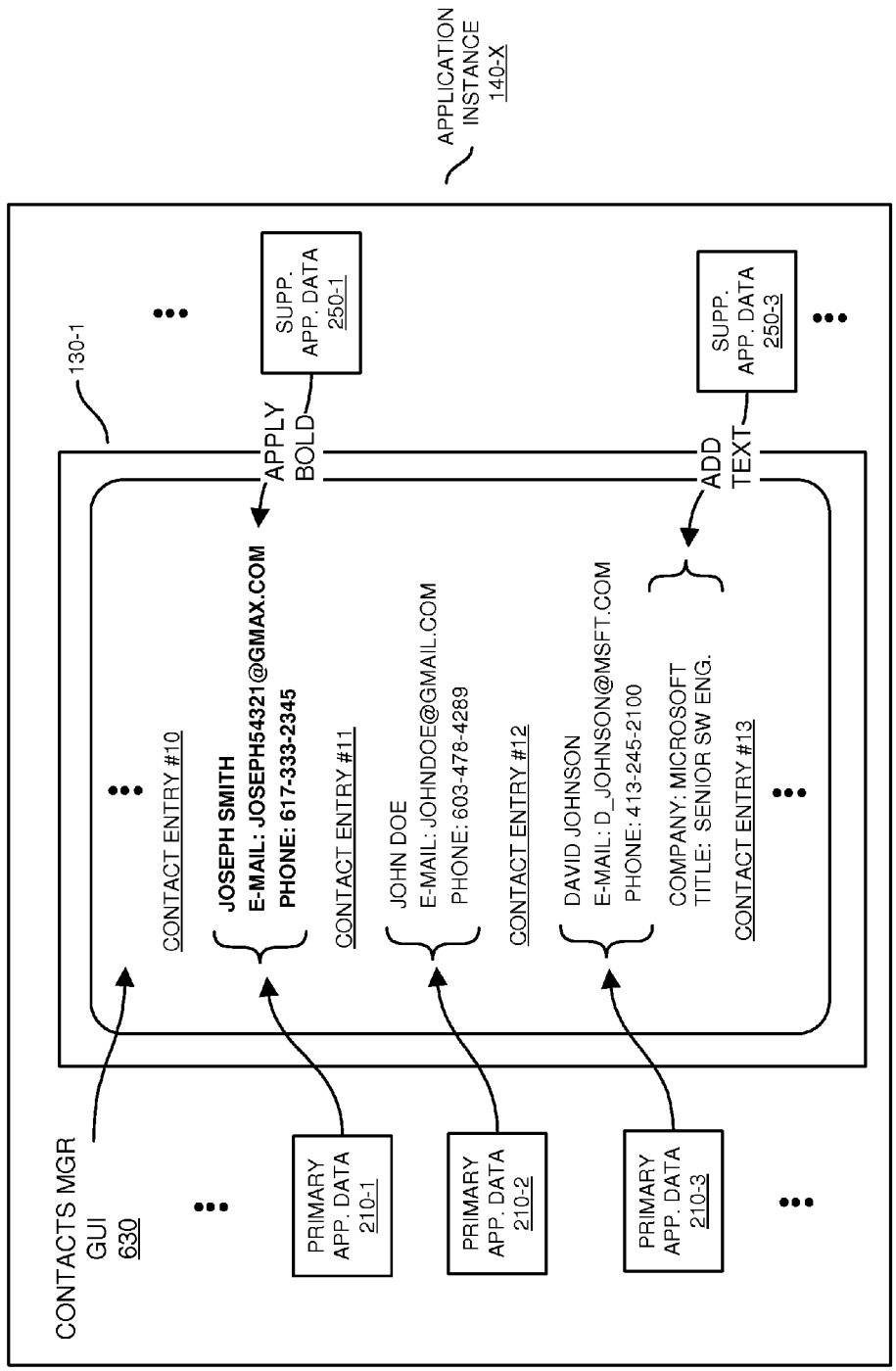
FIG. 6 is an example diagram illustrating use of the primary application data and the supplemental application data by an application instance to display information in a graphical user interface according to embodiments herein.

FIG. 6 is an example diagram illustrating use of the primary application data and the supplemental application data by an application instance according to embodiments herein.

Assume in this example that the primary application data produced by the respective user via application instance 140-1 corresponds to contact information of entries in an address book. For example, assume that primary application data 210-1 includes information (e.g., name, e-mail information, phone information, etc.) associated with a first contact such as Joseph Smith; assume that primary application data 210-2 includes information associated with a second contact such as John Doe; assume that primary application data 210-3 includes information associated with a third contact such as David Johnson; and so on.

As previously discussed, the primary application data 210 can be produced by the user or some other resource.

The storage service provider 120-1 is able to store certain information such as name, e-mail information, phone number, etc. associated with a respective contact. However, assume in this example that the application 140 supports functionality such as bolding text to indicate a favorite) in the contact information when it is displayed in a graphical user interface, adding of extra text for display near a contact, etc.

As noted above there are several reasons why the storage service provider 120-1 may not support storage of such information. As mentioned, the application instance can be configured to initiate creation of supplemental application data 250 in such situations. For example, application instance 140-1 produces supplemental application data 250-1 to indicate selection of highlighting Joseph Smith as a favorite; application instance 140-1 produces supplemental application data 250-3 to indicate additional information (e.g., company and title information) to be displayed for entry David Johnson; and so on. When the application instance 140-1 is written (e.g. coded) by a developer (e.g. a software engineer), the developer can utilize the mechanisms disclosed herein to store supplemental application data 250 within the supplemental storage service provider 120-2 for any data that cannot be stored as primary data 210 in the primary storage service provider 120-1. Application programming interfaces (APIs) can be provided for general functionality disclosed herein such as retrieval of primary application data, creation of a UIV, and communication of the UIV and storage and 1 retrieval of supplemental application data with the supplemental storage service provider 120-2.

In a manner as previously discussed, the application instance 140-1 initiates storage of the supplemental application data and corresponding unique identifier values in storage service provider 120-2.

When the same of different user initiates execution of application instance 140-2 to view the contacts information in network environment 100, the application instance 140-2 initiates retrieval of the primary application data. Via application of the processing function 225 to all or a selected portion of the primary application data, the application instance 140-2 initiates generation of unique identifier values and retrieval of respective supplemental application data. In this instance, the application instance initiates retrieval of supplemental application data 250-1, supplemental application data 250-3, etc., and applies the settings as specified by the supplemental application data to the contacts information eventually displayed in the address book in contacts manager graphical user interface 630.

In one embodiment, note that the application instance 140-2 can initiate further modification to the primary application data information to be displayed in the address book. In such an instance, if a given instance 140 initiates changes to a set of primary application data stored by storage service provider 120-1, the given instance generates a new unique identifier value based on the changes to the set of primary application data and forwards the updated unique identifier value to the server 110-2 for storage in map 260. In this manner, the UIV is always "current" with the most up to date set of primary application data. If the user also modifies the corresponding supplemental application data, the application instance also forwards the updated supplemental application data to the storage service provider 120-2 for storage and subsequent retrieval. Accordingly, via the updated unique identifier value, another application instance can still retrieve the supplemental application data even though the primary application data has changed and any changes to the supplemental application data are also captured and stored (by storage service provider 120-2) for subsequent retrieval.

Figure 7:
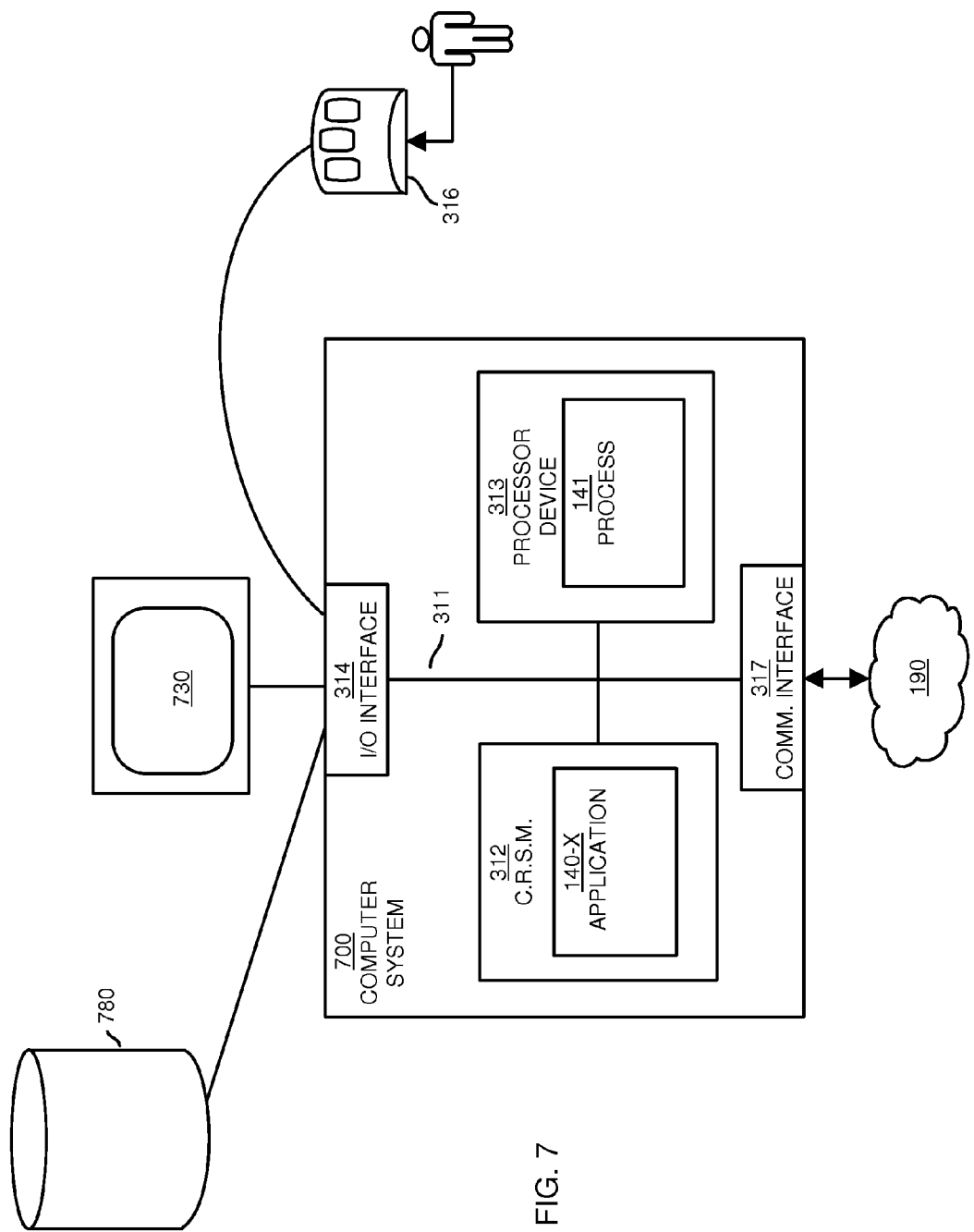
FIG. 7 is an example diagram illustrating example computer architecture for implementing instances of an application according to embodiments herein.

FIG. 7 is an example block diagram of a computer system for executing functionality associated with application instances 140 according to embodiments herein.

Computer system 700 can include one or more computerized devices such as a personal computer, workstation, portable computing device, console, network terminal, processing device, network device, etc., operating as a server, client, etc.

Note that the following discussion provides a basic embodiment indicating how to execute functionality associated with application instances 140 according to embodiments herein. However, it should be noted that the actual configuration for carrying out the operations as described herein can vary depending on a respective application. Also, note that each of the servers 110-1, 110-2, etc., can be configured with similar resources such as a computer readable storage medium and a respective one or more processor device to carry out functionality as discussed herein.

As shown, computer system 700 of the present example includes an interconnect 311 that couples computer readable storage media 312 such as a non-transitory type of computer readable storage media in which digital information can be stored and retrieved. Computer system 700 further includes a processor device 313, I/O interface 314, and a communications interface 317.

I/O interface 314 provides connectivity to input/output devices such as repository 780 and, if present, other devices such as display screen 730, peripheral devices 316, (e.g., keyboard, computer mouse, etc.), etc.

Computer readable storage medium 312 can be any suitable device such as memory, optical storage, hard drive, floppy disk, etc. In one embodiment, the computer readable storage medium 312 is a storage media (i.e., hardware storage media) configured to store instructions and/or data.

Communications interface 317 enables the computer system 700 and processor device 313 to communicate over a network 190 to retrieve information from and/or forward information to any of multiple different remote resources such as other computers, servers, etc. As mentioned, I/O interface 314 enables processor device 313 to retrieve respective information from repository 780.

As shown, computer readable storage media 312 can be encoded with application instance 140 (e.g., software, firmware, etc.) executed by processor device 313.

During operation of one embodiment, processor device 313 accesses computer readable storage media 312 via the use of interconnect 311 in order to launch, run, execute, interpret or otherwise perform the instructions of application 140-X stored on computer readable storage medium 312.

Execution of the application 140-X produces processing functionality such as process 141 in processor device 313. In other words, the application 140-X associated with processor device 313 represents an instance of executing application 140 within or upon the processor device 313 in the computer system 700.

Those skilled in the art will understand that the computer system 700 can include other processes and/or software and hardware components, such as an operating system that controls allocation and use of hardware resources to execute application 140.

In accordance with different embodiments, note that computer system 700 may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by application instances 140 will now be discussed via flowcharts in FIGS. 8 and 9. Note that there will be some overlap with respect to concepts discussed above for FIGS. 1 through 7. Also, note that the steps in the below flowcharts need not always be executed in the order shown. That is, the steps can be executed in any suitable order.

Figure 8:
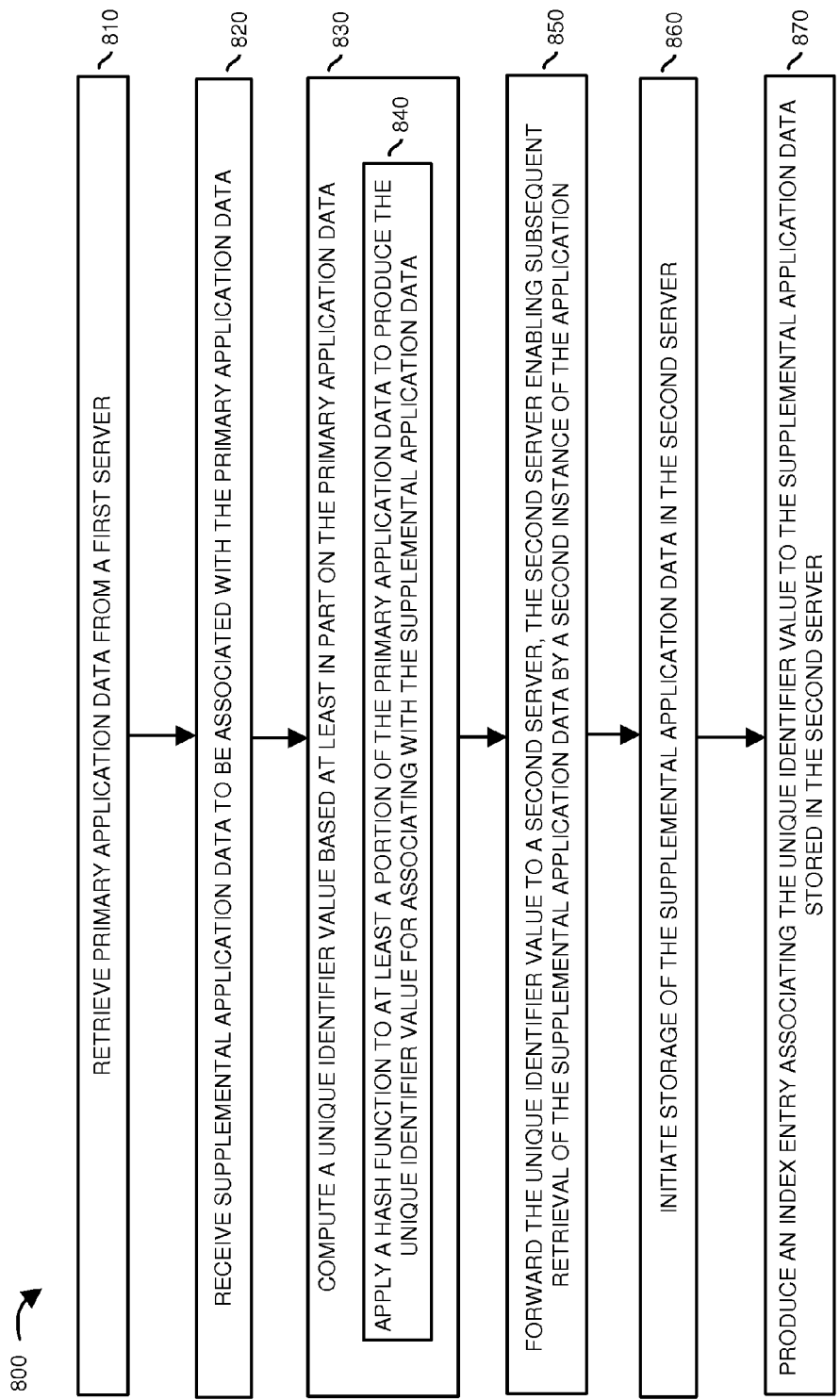
FIG. 8 is a flowchart illustrating an example method of generating a unique identifier value for subsequent retrieval of corresponding supplemental application data according to embodiments herein.

FIG. 8 is a flowchart 800 illustrating a method of processing primary application data according to embodiments herein.

In step 810, the application instance 140-1 retrieves primary application data 210-1. The primary application data 210-1 can be retrieved from server 110-1 or produced by the user.

In step 820, the application instance 140-1 receives supplemental application data to be associated with the primary application data 210-1.

In step 830, the application instance 140-1 computes a unique identifier value 230-1 based at least in part on the primary application data 210-1.

In sub-step 840, the application instance 140-1 applies a processing function such as a hash function to at least a portion (e.g., e-mail address, phone number, etc.) of the primary application data 210-1 to produce the unique identifier value 230-1 for associating with the supplemental application data 250-1.

In step 850, the application instance 140-1 forwards the unique identifier value 230-1 to server 110-2; the server 110-2 enables subsequent retrieval of the supplemental application data 250-1 by application instance 140-2.

In step 860, the application instance 140-1 initiates storage of the supplemental application data 250-1 in server 120-2.

In step 870, the server 110-2 initiates storage of an index entry in map 260, associating the unique identifier value 230-1 to the supplemental application data 250-1 stored in repository 180-2.

Figure 9:
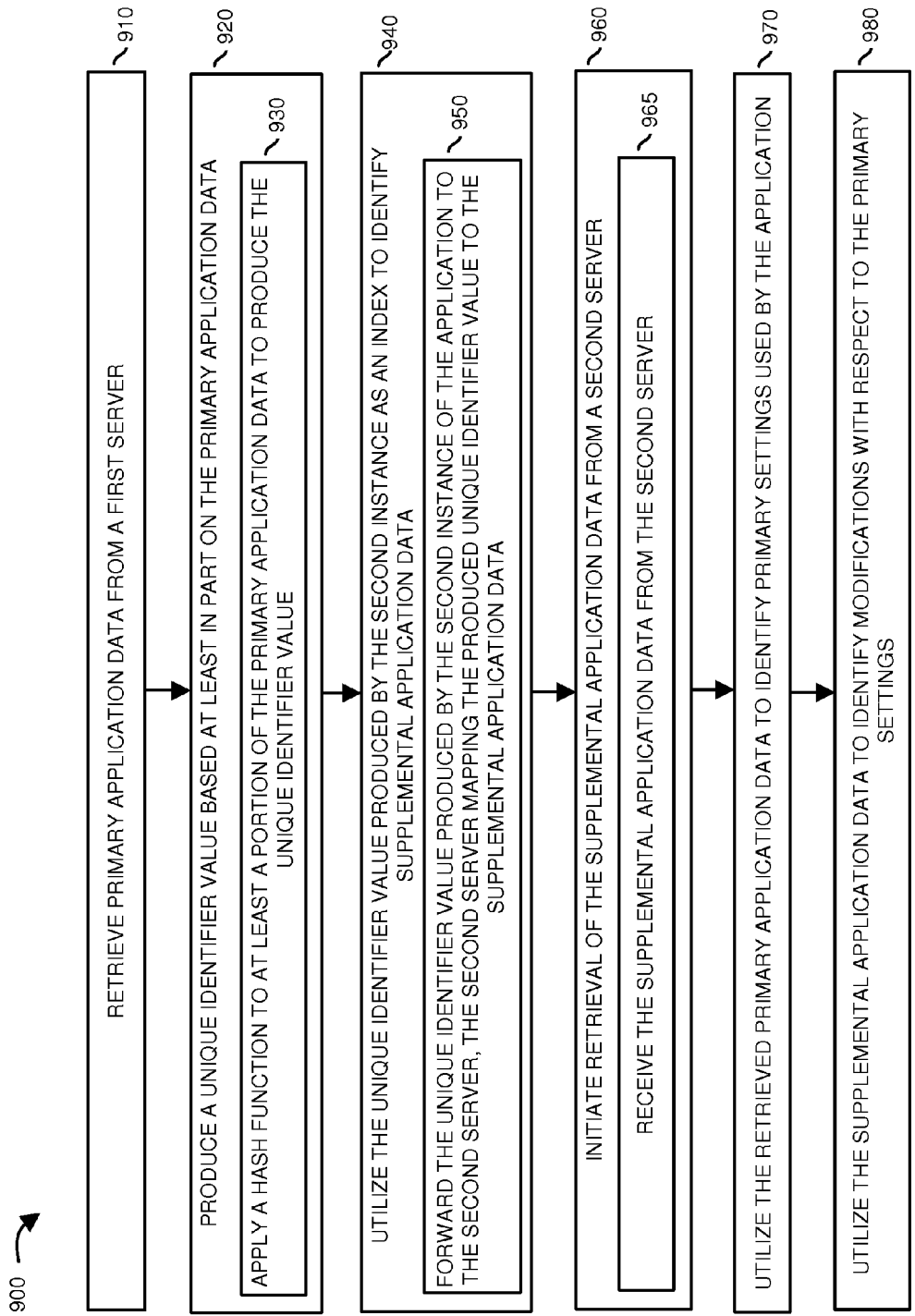
FIG. 9 is an example diagram illustrating generation of a unique identifier value based on retrieved primary application data for subsequent retrieval of corresponding supplemental application data according to embodiments herein.

FIG. 9 is a flowchart 900 illustrating a method of processing application data according to embodiments herein.

In step 910, the application instance 140-2 retrieves primary application data 210-1 from server 110-1.

In step 920, the application instance 140-2 produces a unique identifier value 230-1 based at least in part on the primary application data 210-1 retrieved form server 110-1.

In sub-step 930, the application instance 140-2 applies a hash or other suitable function to at least a portion of the primary application data 210-1 to produce the unique identifier value 230-1.

In step 940, the application instance 140-2 utilizes the unique identifier value 230-1 (as produced by the application instance 140-2) as an index to identify the supplemental application data 250-1 stored in storage service provider 120-2.

In sub-step 950, the application instance 140-2 forwards the unique identifier value 230-1 to the server 110-2. The second server 110-2 maps the unique identifier value 230-1 as produced by the application instance 140-2 to the supplemental application data 250-1.

In step 960, the application instance 140-2 initiates retrieval of the supplemental application data 250-1 from server 110-2.

In sub-step 965, the application instance 140-2 receives the supplemental application data 250-1 from the server 110-2.

In step 970, the application instance 140-2 utilizes the retrieved primary application data 140-2 to identify primary settings associated with application instance 140-2.

In step 980, the application instance 140-2 utilizes the supplemental application data 250-1 to identify modifications with respect to the primary settings as specified by the primary application data 210-1.

Using the techniques disclosed herein, each of multiple different instances of the same executed application can access data services provided by a cloud computing environment while still allowing customization of the application by accessing supplemental application data stored at one or more different locations without having to store the supplemental data locally, which would restrict usage of a computer system. In this manner, even though a cloud computing environment may not support additional features, an application utilizing the system disclosed herein can provide additional services for a user and those services (that require storage and access to supplemental data) will be available on different devices used by that user.

The same processing function used by the different instances of the application to produce the unique identifier values to retrieve the supplemental application data can be unique with respect to the user of the application. Accordingly, only the user's application (amongst may possible applications) will be able to generate the appropriate keys or index values to retrieve the supplemental application data. Thus, embodiments herein can provide a level of security over conventional techniques.

As mentioned, in an example embodiment, the primary application data and the supplemental application data can pertain to contacts information used in an address book. In such an embodiment, in a first instance of the application, when the user operates the application to create or modify data that cannot be written back to a first storage service provider located in the network, the application 140 creates a unique identifier value (e.g., an index value, a hash-based key, etc.) based on properties of the primary application data (e.g., specific contact information) and uses this key to store the additional contact information that is identified only by the key. The application then sends this unique identifier value to a second storage service provider. The second storage service provider stores the unique identifier value and allows the supplemental application data to be synchronized to any other instance of that application operated by that user.

When the second instance of the application attempts synchronization, the second instance of the application produces hash values for each of the contacts. The second instance of the application forwards the hash values (i.e., unique identifier values) to the supplemental server to check whether supplemental data is available for a respective contact. If so, the supplemental server forwards the data to the second instance of the application. Via retrieval of the primary application data from the first storage service provider and retrieval of the supplemental application data for each contact from the second storage service provider, the second instance of the application can be properly synchronized.

Techniques herein are well suited for use in applications in which multiple instances of software can be executed on multiple disparately located devices connected to a network. However, it should be noted that embodiments herein are not limited to use in such applications and that the techniques discussed herein are well suited for other applications as well.

Note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a computer-readable storage medium (i.e., any type of hardware storage medium) on which software instructions are encoded for subsequent execution. The instructions and/or program, when executed in a computerized device having a processor, cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Other embodiments of the present disclosure include software programs and/or respective hardware to perform any of the method embodiment steps and operations summarized above and disclosed in detail below. The ordering of the steps has been added for clarity sake. These steps can be performed in any suitable order.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Microsoft Corporation, Redmond, Wash., USA.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated via processing circuitry and/or software. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
    in a first instance of an application, said first instance of an application being executed on a first computing device:
    retrieving primary application data from a first server, the primary application data comprising a first data format that the first server supports, the first server operated by a first storage service provider;
    receiving supplemental application data to be associated with the primary application data, the supplemental application data comprising a second data format that the first server does not support;
    computing a first unique identifier value based at least in part on the primary application data;
    forwarding the first unique identifier value to a second server, the second server supporting the second data format and enabling subsequent retrieval of the supplemental application data by a second instance of the application, said second instance of the application being executed on a second computing device, using the first unique identifier value, the second server operated by a second storage service provider different than the first storage service provider, and wherein the supplemental application data is data that is unable to be stored as primary application data in the first server; and
    in the second instance of the application:
    retrieving the primary application data from the first server,
    computing a second unique identifier value based at least in part on the primary application data, and
    utilizing the second unique identifier value produced by the second instance by forwarding the second unique identifier value produced by the second instance of the application to the second server, the second server mapping the second unique identifier value to the supplemental application data by comparing the second unique identifier value to the first unique identifier value and receiving the supplemental application data from the second server.

2. The method as in claim 1 further comprising:
    via the second instance of the application:
    utilizing the retrieved primary application data to identify primary settings used by the application; and
    utilizing the supplemental application data to identify modifications with respect to the primary settings, the modifications being data that is unable to be stored with the primary application data in the first server.

3. The method as in claim 1 further comprising:
    via the first instance of the application:
    storing the supplemental application data in the second server;
    producing an index entry associating the first unique identifier value to the supplemental application data stored in the second server; and
    storing the index entry to retrieve the supplemental application data from the second server.

4. The method as in claim 1, wherein computing the first unique identifier value based at least in part on the primary application data includes:
    applying a hash function to at least a portion of the primary application data and a user identity of a user operating first instance of the application to produce the first unique identifier value for associating with the supplemental application data to allow access to the supplemental application data by the user of a second instance of the application; and
    wherein the primary application data at least in part specifies settings information to be used by the first instance of the application; and
    wherein the supplemental application data indexed by the first unique identifier value specifies modifications with respect to the primary application data.

5. The method as in claim 1 further comprising:
    via the second instance of the application:
    modifying the primary application data;
    storing the modified primary application data in the first server;
    computing the second unique identifier value based on the modified primary application data; and
    forwarding the second unique identifier value for the modified primary application data to the second server, the second unique identifier allowing a subsequent instance of the application to identify supplemental application data associated to the primary application data for a user of the subsequent instance of the application.

6. The method as in claim 1, wherein the user executes the first instance of the application on a first computer at a first location in a network environment; and
    wherein the user executes the second instance and the subsequent instance of the application one at least one second computer at a second location in the network environment.

7. A computer system comprising:
    at least one processor device;
    at least one storage resource that stores instructions associated with an application, the application executed by the at least one processor device; and
    at least one interconnect coupling the at least one processor device and the at least one storage resource, the at least one interconnect enabling the computer system to execute a first instance of the application, said first instance of the application being executed by the at least one processor device and perform operations of:
    retrieving primary application data from a first server, the primary application data comprising a first data format that the first server supports, the first server operated by a first storage service provider;
    computing a unique identifier value based at least in part on the primary application data;
    utilizing the unique identifier value produced by the first instance as an index to identify supplemental application data stored by a second server, the supplemental application data comprising a second data format that the first server does not support and that is supported by the second server, said supplemental application data accessible by a second instance of the application being executed on a processor different from said at least one processor device, the second server operated by a second storage service provider different than the first storage service provider, and wherein the supplemental application data is data that is unable to be stored as primary application data in the first server, the second instance of the application includes:

retrieving the primary application data from the first server,
  computing a second unique identifier value based at least in part on the primary application data, and
  utilizing the second unique identifier value produced by the second instance by forwarding the second unique identifier value produced by the second instance of the application to the second server, the second server mapping the second unique identifier value to the supplemental application data by comparing the second unique identifier value to the first unique identifier value and receiving the supplemental application data from the second server; and
  retrieving the identified supplemental application data from the second server.

8. The computer system as in claim 7, wherein utilizing the unique identifier value produced by the first instance includes: forwarding the unique identifier value produced by the first instance of the application to the second server, the second server mapping the unique identifier value to the supplemental application data.

9. The computer system as in claim 1, wherein the second instance of the application supports operations of:
  utilizing the retrieved primary application data to identify primary settings used by the application; and
  utilizing the supplemental application data to identify modifications with respect to the primary settings.

10. The computer system as in claim 7, wherein computing the unique identifier value includes:
  applying a hash function to at least a portion of the primary application data to produce the unique identifier value.

11. The computer system as in claim 10, wherein the primary application data at least in part specifies settings information to be used by the first instance of the application; and
  wherein the supplemental application data indexed by the unique identifier value specifies modifications with respect to the primary application data.

12. A computer-readable hardware storage medium having instructions stored thereon for processing data information, such that the instructions, when carried out by a processing device, cause the processing device to perform operations of:
  via a first instance of an executed application, said first instance executing on the processing device:
  retrieving primary application data from a first server, the primary application data comprising a first data format that the first server supports, the first server operated by a first storage service provider;
  receiving supplemental application data to be associated with the primary application data, the supplemental data being data that is unable to be stored by the first server, the supplemental application data comprising a second data format that the first server does not support;
  computing a first unique identifier value based at least in part on the primary application data;
  forwarding the first unique identifier value to a second server, the second server supporting the second data format and enabling subsequent retrieval of the supplemental application data by a second instance of the application, said second instance executing on a second computing device, the second server operated by a second storage service provider different than the first storage service provider, and wherein the supplemental application data is data that is unable to be stored as primary application data in the first server; and
  in the second instance of the application:
  retrieving the primary application data from the first server,
  computing a second unique identifier value based at least in part on the primary application data, and
  utilizing the second unique identifier value produced by the second instance by forwarding the second unique identifier value produced by the second instance of the application to the second server, the second server mapping the second unique identifier value to the supplemental application data by comparing the second unique identifier value to the first unique identifier value and receiving the supplemental application data from the second server.

13. The computer-readable hardware storage medium as in claim 12, wherein the instructions when carried out by the processing device cause the processing device to perform operations of:
  storing the supplemental application data in the second server;
  producing an index entry associating the first unique identifier value to the supplemental application data stored in the second server; and
  storing the index entry to retrieve the supplemental application data from the second server.

\* \* \* \* \*